(12) United States Patent
Chae et al.

(10) Patent No.: US 9,329,424 B2
(45) Date of Patent: May 3, 2016

(54) IN-CELL TOUCH TYPE LIQUID CRYSTAL DISPLAY DEVICE

(71) Applicant: LG Display Co., Ltd., Seoul (KR)

(72) Inventors: Ji-Eun Chae, Gyeongsangbuk-do (KR); Tae-Keun Lee, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 18 days.

(21) Appl. No.: 14/584,020

(22) Filed: Dec. 29, 2014

(65) Prior Publication Data

US 2016/0062164 A1  Mar. 3, 2016

(30) Foreign Application Priority Data

Aug. 26, 2014 (KR) .................. 10-2014-0111791

(51) Int. Cl.
  *G02F 1/1335* (2006.01)
  *G06F 3/045* (2006.01)
  *G02F 1/1333* (2006.01)
  *G02F 1/1368* (2006.01)

(52) U.S. Cl.
  CPC .......... *G02F 1/13338* (2013.01); *G02F 1/1368* (2013.01)

(58) Field of Classification Search
  CPC ..................... G02F 1/13338; G02F 1/1368
  See application file for complete search history.

(56) References Cited

U.S. PATENT DOCUMENTS

| 2008/0129898 | A1 | 6/2008 | Moon |
| 2011/0157039 | A1 | 6/2011 | Shin et al. |
| 2011/0210927 | A1* | 9/2011 | Mizuhashi ............... G06F 3/044 345/173 |
| 2012/0044202 | A1* | 2/2012 | Ishizaki ............... G02F 1/13338 345/174 |
| 2012/0268418 | A1* | 10/2012 | Ishizaki ............... G06F 3/0412 345/174 |
| 2013/0257794 | A1 | 10/2013 | Lee et al. |
| 2013/0314343 | A1* | 11/2013 | Cho ............... G06F 3/0412 345/173 |
| 2014/0118277 | A1 | 5/2014 | Kim et al. |
| 2014/0168537 | A1* | 6/2014 | Han ............... G06F 3/0412 349/12 |
| 2015/0084912 | A1* | 3/2015 | Seo ............... G06F 3/0412 345/174 |

FOREIGN PATENT DOCUMENTS

| CN | 102411237 A | 4/2012 |
| CN | 103424909 A | 12/2013 |
| KR | 10-2011-0075411 A | 7/2011 |

(Continued)

OTHER PUBLICATIONS

Korean Office Action dated Aug. 10, 2015, for corresponding Korean Patent Application No. 10-2014-0111791.

(Continued)

*Primary Examiner* — Donald Raleigh
(74) *Attorney, Agent, or Firm* — Fenwick & West LLP (57) ABSTRACT

An in-cell touch type liquid crystal display device includes a touch line and a dummy touch line along a direction between neighboring pixel electrodes on a first passivation layer; a second passivation layer on the touch line and the dummy touch line; and common electrodes separated from one another in respective touch blocks, and each including first openings corresponding to each pixel region and a second opening corresponding to the touch line, wherein a connection pattern extending over a gate line from a side of the touch line at an inner region of the touch block is connected to a common electrode through a touch contact hole, and wherein an open portion is between the touch line and the dummy touch line.

6 Claims, 11 Drawing Sheets

(56) References Cited

FOREIGN PATENT DOCUMENTS

| KR | 10-2013-0110392 A | 10/2013 |
|---|---|---|
| KR | 10-2014-0054739 A | 5/2014 |
| KR | 10-2014-0087431 A | 7/2014 |
| TW | 201329813 A1 | 7/2013 |

OTHER PUBLICATIONS

Taiwan Intellectual Property Office, Office Action, Taiwanese Patent Application No. 103145315, Jan. 7, 2016, nine pages.

* cited by examiner

IN-CELL TOUCH TYPE LIQUID CRYSTAL DISPLAY DEVICE

This application claims the benefit of Korean Patent Application No. 10-2014-0111791, filed on Aug. 26, 2014, which is hereby incorporated by reference for all purposes as if fully set forth herein.

BACKGROUND OF THE INVENTION

1. Field of the Invention

The present invention relates to a liquid crystal display device (LCD), and more particularly, to an in-cell touch type LCD.

2. Discussion of the Related Art

Recently, LCDs have been spotlighted as next generation high-tech display devices of low power consumption, good portability, high added value and the like.

Among the LCDs, active matrix type LCDs are widely used, which includes a thin film transistor (TFT) in each pixel.

The LCD is applied to various appliances such as TV, projector, mobile phone and PDA, and the appliances have a touch function to touch a screen and conduct an operation.

An LCD having a touch function embedded therein is referred to as an in-cell touch type LCD.

The in-cell touch type LCD includes gate and data lines, and additionally, touch blocks to sense a touch and touch lines connected to the touch blocks.

In the in-cell touch type LCD, a common electrode is supplied with a common voltage for a display period to display an image. The common electrode functions as a touch electrode to sense a touch for a non-display period not to display an image.

Accordingly, when a user touch a touch region, for example, using a user's finger, a touch capacitance is produced between common electrodes which are separately formed at respective touch blocks. A touch position is detected by comparing the touch capacitance by the user's touch with a reference capacitance, and an operation according to the touch position is conducted.

In this regard, by comparing the touch capacitance with the reference capacitance, a coordinate where the user's touch happens is recognized, and then an operation corresponding to the coordinate is conducted.

Accordingly, a touch line, which transmits change of capacitance of a common electrode formed at each touch block to a sensing circuit portion that is located at a non-display region or printed circuit board, is required. Since the touch line is connected to the common electrode, the touch line cannot be formed at the same layer as the common electrode.

SUMMARY OF THE INVENTION

Accordingly, the present invention is directed to an in-cell touch type liquid crystal display device (LCD) that substantially obviates one or more of the problems due to limitations and disadvantages of the related art.

An object of the present invention is to provide an in-cell touch type LCD that can compensate for a load difference between a gate line at an inner region of a touch block and a gate line at a boundary region of a touch block and improve display quality.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, an in-cell touch type liquid crystal display device includes gate and data lines crossing each other at a boundary of a pixel region on a substrate which includes a plurality of touch block each including a plurality of pixel regions; a thin film transistor in each pixel region and connected to the gate and data lines; a pixel electrode in the pixel region connected to the thin film transistor; a first passivation layer on the pixel electrode; a touch line and a dummy touch line along a direction between neighboring pixel electrodes on the first passivation layer; a second passivation layer on the touch line and the dummy touch line; and common electrodes separated from one another in respective touch blocks, and each including first openings corresponding to each pixel region and a second opening corresponding to the touch line, wherein a connection pattern extending over the gate line from a side of the touch line at an inner region of the touch block is connected to the common electrode through a touch contact hole, and wherein an open portion is between the touch line and the dummy touch line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to exemplary embodiments, examples of which are illustrated in the accompanying drawings. The same reference numbers may be used throughout the drawings to refer to the same or like parts.

[First Embodiment]

Figure 1:
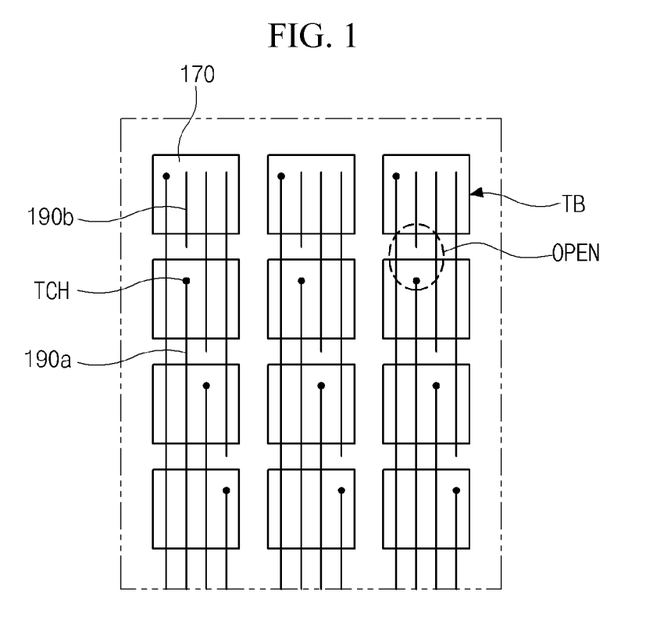
FIG. 1 is a view illustrating a structure of touch blocks of an in-cell touch type LCD according to a first embodiment of the present invention.
Figure 2:
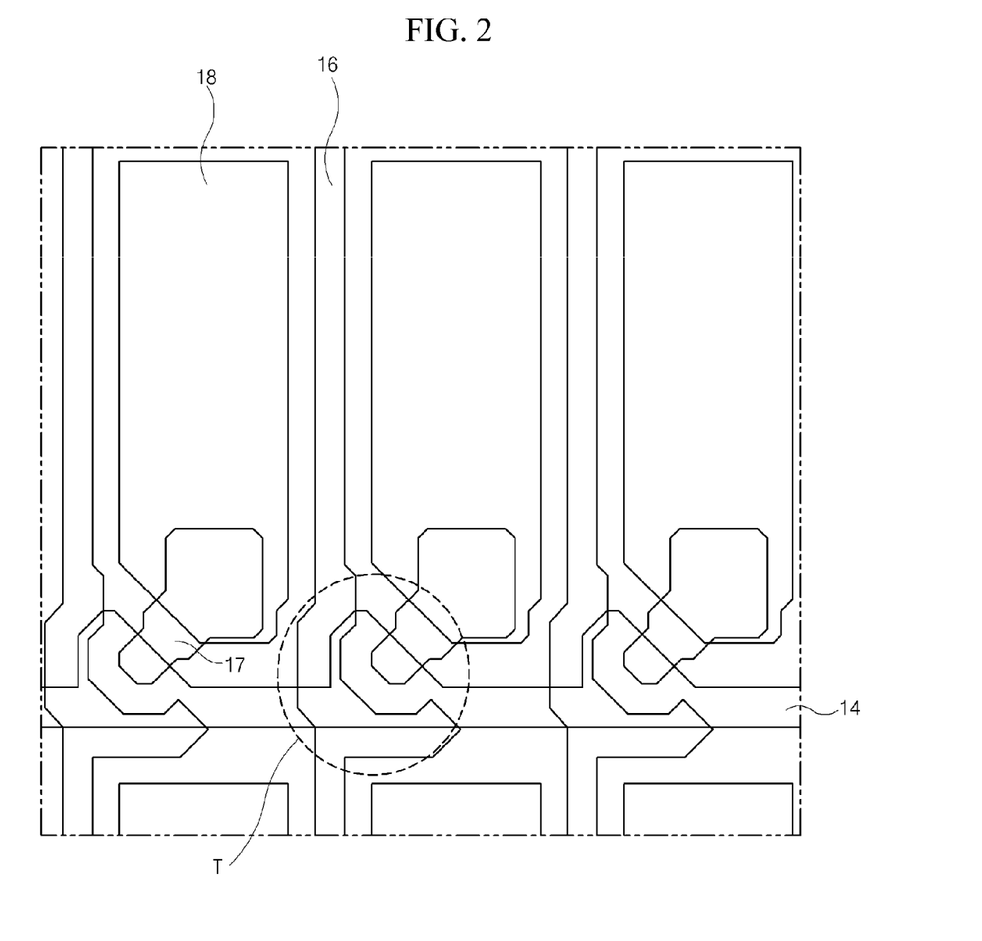
FIG. 2 is a view illustrating an in-cell touch type LCD according to a first embodiment of the present invention.
Figure 3A:
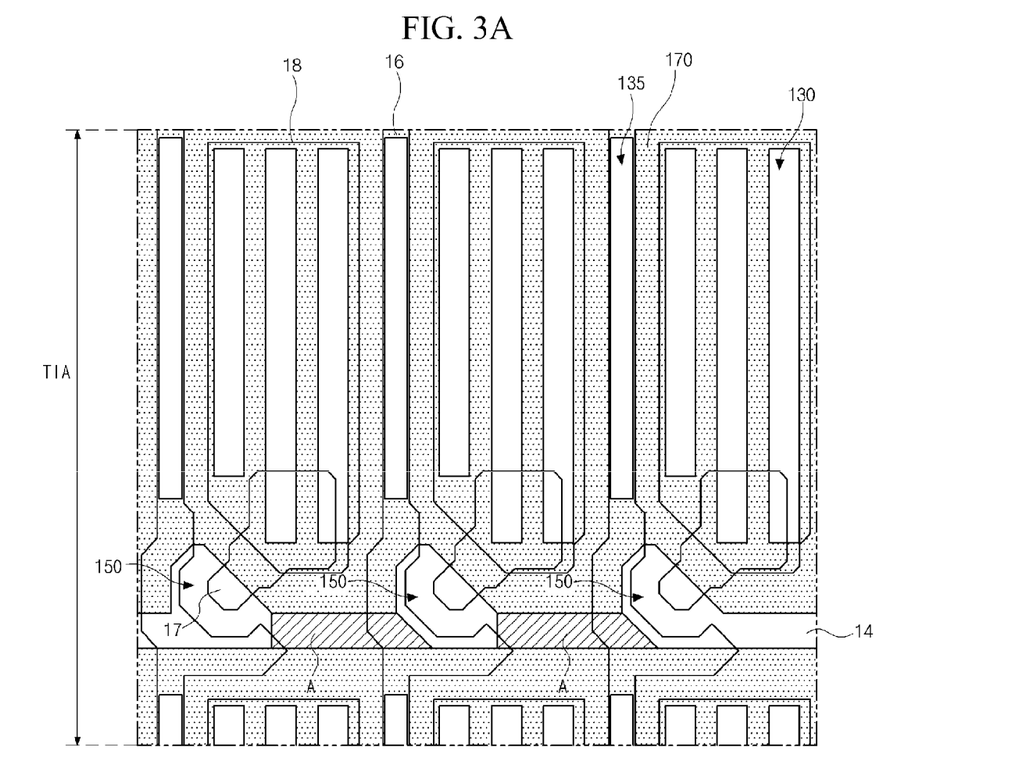
FIGS. 3A and 3B are views illustrating an inner region and a boundary region of a touch block of an in-cell touch type LCD according to a first embodiment of the present invention, respectively.
Figure 3B:
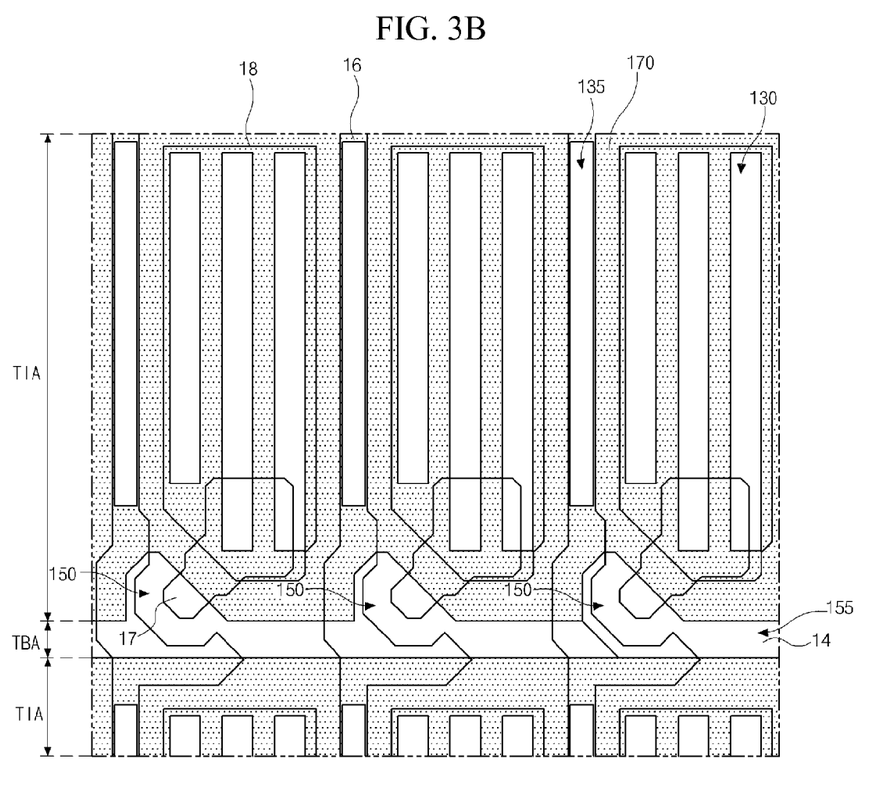

FIG. 1 is a view illustrating a structure of touch blocks of an in-cell touch type LCD according to a first embodiment of the present invention, FIG. 2 is a view illustrating an in-cell touch type LCD according to a first embodiment of the present invention, and FIGS. 3A and 3B are views illustrating an inner region and a boundary region of a touch block of an in-cell touch type LCD according to a first embodiment of the present invention, respectively. For the purpose of explanation, touch lines and common electrodes are omitted in FIG. 2, and touch lines are omitted in FIGS. 3A and 3B.

Referring to FIGS. 1 to 3B, the in-cell touch type LCD includes a display region including a plurality of pixel regions and a non-display region surrounding a display region.

A plurality of touch blocks TB are defined in the in-cell touch type LCD. The plurality of touch blocks TB each have a group of pixel regions neighboring to one another in a row direction and a column direction.

Gate lines 14 and data lines 16 are formed on a substrate and cross each other to define pixel regions.

Each pixel region includes a thin film transistor T connected to the corresponding gate and data lines 14 and 16, and a pixel electrode 18 connected to a drain electrode 17 of the thin film transistor T.

A touch line 190a and a dummy touch line 190b is formed at a boundary of the pixel region between the pixel electrodes 18. A passivation layer (not shown) is formed on the touch line 190a, the dummy touch line 190b and the pixel electrode 18.

Common electrodes 170 are formed on the passivation layer and in respective touch blocks TB, and are separated from one another. The common electrode 170 includes first openings 130 corresponding to each pixel region, and a second opening 135 corresponding to the touch line 190a. The second opening 135 has a shape similar to the first opening 130.

The touch line 190a is below the common electrodes 170. The touch line 190a is connected to the common electrode 170 of the corresponding touch block TB through a touch contact hole TCH. The touch line 190a is not connected to common electrodes 170 of touch blocks TB other than the corresponding touch block TB connected thereto. The touch line 190a transmits a touch signal i.e., change of capacitance between neighboring common electrodes 170.

The dummy touch line 190b is formed below the common electrodes 170 and is not connected to any common electrodes 170. In other words, the dummy touch line 190b does not transmit a touch signal.

In this regard, the touch lines 190a connected to the common electrodes 170 of the touch blocks TB are arranged substantially non-uniformly on an array substrate, thus capacitances between the common electrodes 170 and the touch lines 190a become different, and thus display quality is degraded. To prevent this, the dummy touch lines 190b are formed.

The touch line 190a and the dummy touch line 190b are not connected to each other, and an open portion OPEN between the touch line 190a and 190b is formed at a boundary portion of the touch block TB.

The common electrode 170 includes the first openings 130 in each pixel region, and the second opening 135 corresponding to the touch line 190a and the dummy touch line 190b. Further, the common electrode 170 includes a third opening 150 corresponding to the thin film transistor T, and a fourth opening 155 corresponding to the gate line 14.

The common electrode 170 formed at an inner region TIA of the touch block TB extends over a region "A" corresponding to the gate line 14 between the pixel electrodes 18 of neighboring pixel regions. Accordingly, portions of the common electrode 170 corresponding to the pixel regions in the touch block TB are connected to one another through the regions "A".

Accordingly, a portion of the common electrode 170 corresponding to the pixel region in the inner region TIA of the touch block TB has an area greater than a portion of the common electrode 170 corresponding to the pixel region at a boundary region TBA of the touch block TB.

Figure 4:
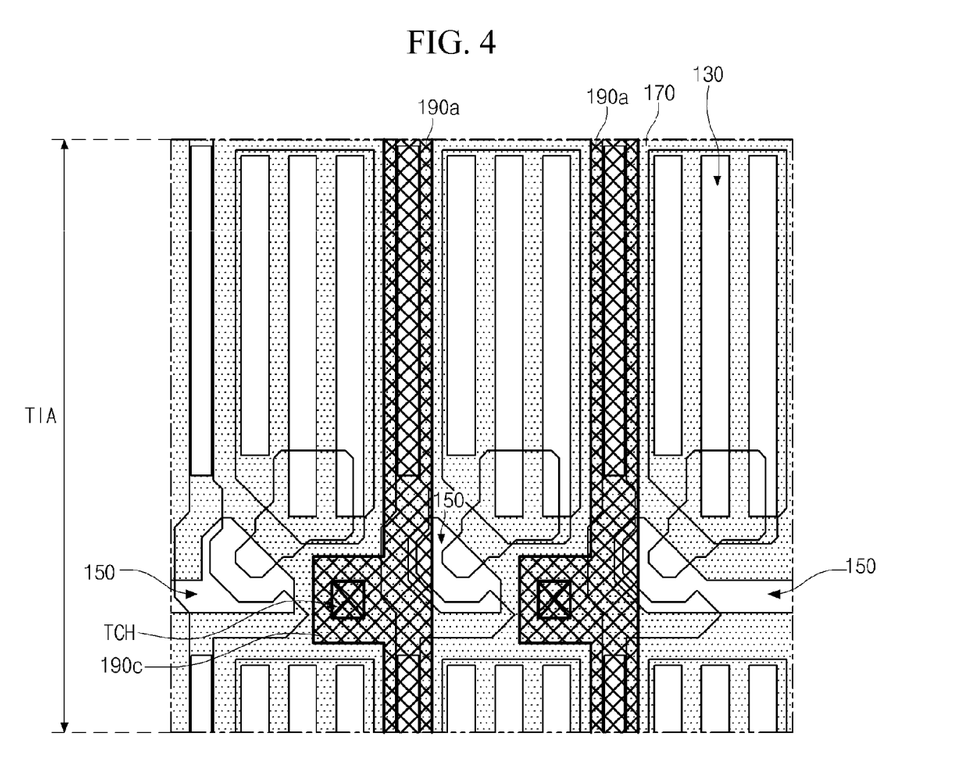
FIGS. 4 and 5 are views illustrating an inner region and a boundary region of a touch block of an in-cell touch type LCD according to a first embodiment of the present invention, respectively.
Figure 5:
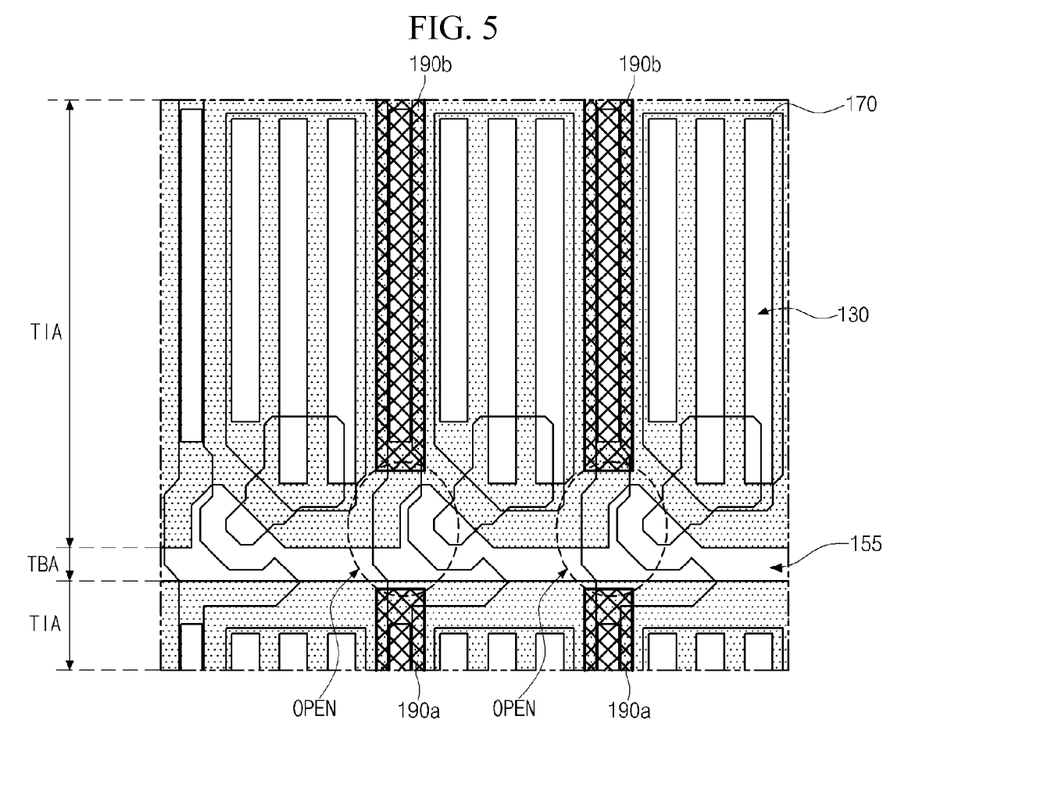

FIGS. 4 and 5 are views illustrating an inner region and a boundary region of a touch block of an in-cell touch type LCD according to a first embodiment of the present invention, respectively.

Referring to FIGS. 4 and 5, in the in-cell touch type LCD, a connection pattern 190c extends from the touch line 190a at the inner region TIA of the corresponding touch block TB, and is connected to the common electrode 170 through the touch contact hole TCH. The connection pattern 190c may be located corresponding to the gate line 14. The open portion OPEN is formed between the touch line 190a and the dummy touch line 190b.

A first passivation layer is formed on the pixel electrode 18. The touch line 190a and the dummy touch line 190b are formed on the first passivation layer at the boundary of the pixel region. A second passivation layer is formed on the touch line 190a and the dummy touch line 190b. The common electrode 170 is formed on the second passivation layer.

The connection pattern 190c extending from one side of the touch line 190a is connected to the common electrode 170, and the touch line 190a transmits a touch signal to a sensing circuit.

It is preferred, but not limited, that the touch line 190a and the dummy touch line 190b are formed of a low resistance metal material such as aluminum (Al) or copper (Cu) to prevent delay of a touch signal.

The touch line 190a and the dummy touch line 190b are formed at the boundary of the pixel region between the pixel electrodes 18. The touch line 190a and the dummy touch line 190b are not connected to a region between neighboring touch blocks TB. The open portion OPEN between the touch line 190a and the dummy touch line 190b is formed over the gate line 14 at the boundary portion TBA of the touch block TB.

Figure 6:
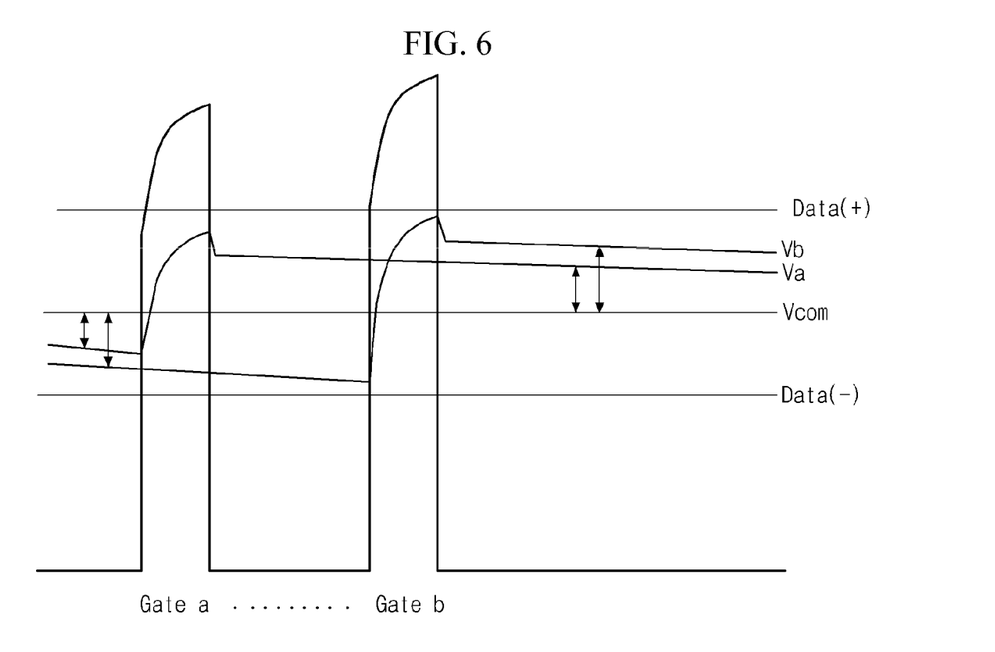
FIG. 6 is a graph illustrating a brightness difference between a pixel region at an inner region of a touch block and a pixel region at a boundary region of a touch block according to a first embodiment of the present invention.

FIG. 6 is a graph illustrating a brightness difference between a pixel region at an inner region of a touch block and a pixel region at a boundary region of a touch block according to a first embodiment of the present invention.

Referring to FIGS. 4 and 5, the common electrode 170 corresponding to the pixel region at the inner region TIA of the touch block TB has an additional area of the region "A", compared with the common electrode 170 corresponding to the pixel region at the boundary region TBA of the touch block TB.

Further, at the inner region TIA of the touch block TB, the connection pattern 190c extending over the gate line 14 (i.e., "Gate a" in FIG. 6) from the touch line 190a is connected to the common electrode 170. However, at the boundary region TBA of the touch block TB, the open portion TBA is formed, and the connection pattern 190c and the common electrode 170 are not formed.

Accordingly, at the inner region TIA of the touch block TB, due to a capacitance produced between the gate line "Gate a", and the connection pattern 190c and the common electrode at the region A, a load of the gate line "Gate a" at the inner region TIA of the touch block TB increases.

However, at the boundary region TBA of the touch block TB, the connection pattern 190c and the common electrode 170 are not formed over the gate line 14 (i.e., "Gate b" in FIG. 6), thus no capacitance therebetween is produced, and thus a load of the gate line "Gate b" at the boundary region TBA of the touch block TB is less than that of the gate line "Gate a" at the inner region TIA of the touch block TB.

Accordingly, referring to FIG. 6, since an output of a gate signal applied to the gate line "Gate b" of a less load increases, a charging time of a data voltage of a pixel electrode of the pixel region at the boundary region TBA increases, and thus this pixel region is relatively high charged with a data voltage Vb.

However, since an output of a gate signal applied to the gate line "Gate b" of a greater load decreases, a charging time of a data voltage of a pixel electrode of the pixel region at the inner region TIA decreases, and thus this pixel region is relatively low charged with a data voltage Va.

Accordingly, the pixel region at the boundary region TBA of the touch block TB is seen brighter than the pixel region at the inner region TIA of the touch block, and thus display quality is degraded.

[Second Embodiment]

Figure 7:
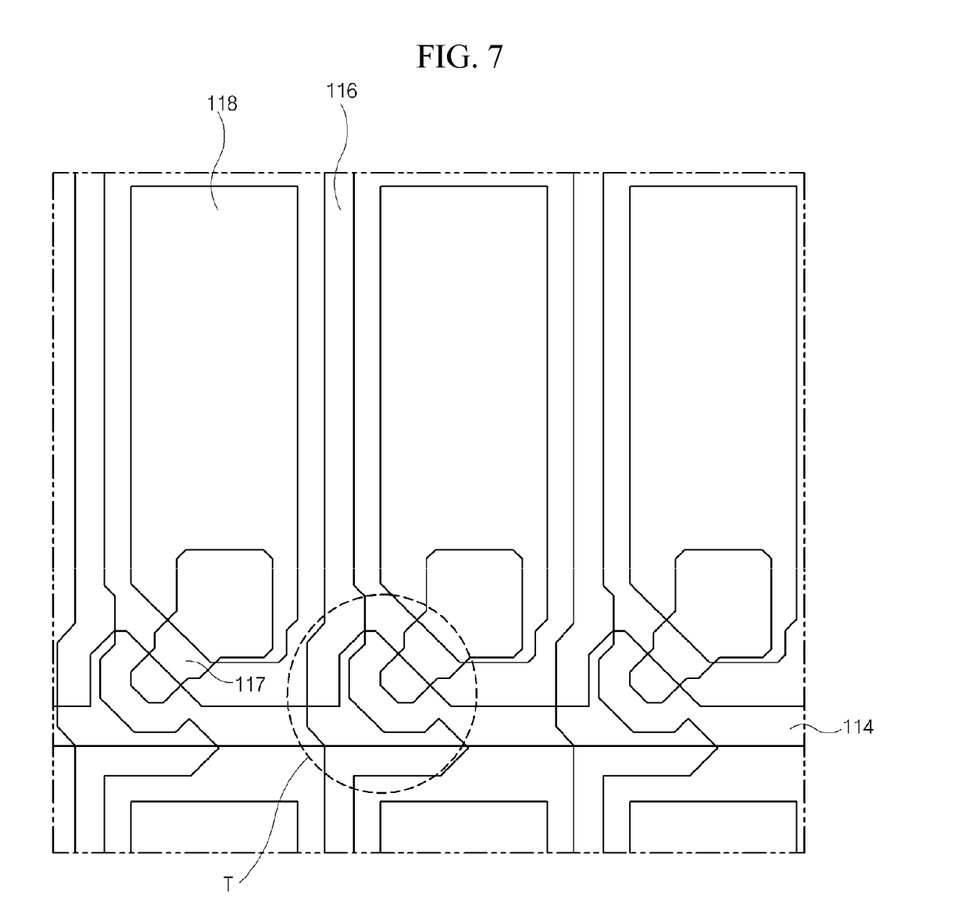
FIG. 7 is a view illustrating an in-cell touch type LCD according to a first embodiment of the present invention.
Figure 8:
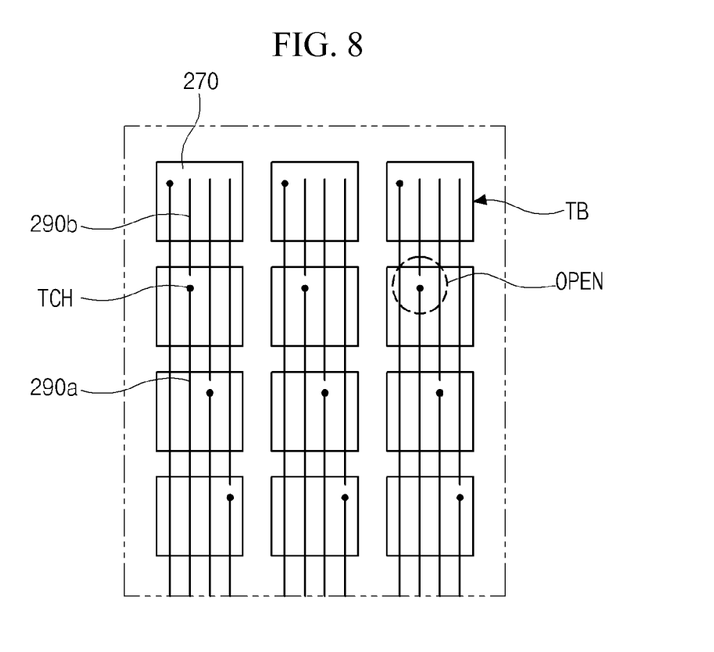
FIG. 8 is a view illustrating a structure of touch blocks of an in-cell touch type LCD according to a second embodiment of the present invention.

FIG. 7 is a view illustrating an in-cell touch type LCD according to a first embodiment of the present invention, and FIG. 8 is a view illustrating a structure of touch blocks of an in-cell touch type LCD according to a second embodiment of the present invention. For the purpose of explanation, touch lines and common electrodes are omitted in FIG. 7. Further, explanations of parts similar to parts of the first embodiment may be omitted.

Referring to FIGS. 7 and 8, the in-cell touch type LCD includes a display region including a plurality of pixel regions and a non-display region surrounding a display region.

A plurality of touch blocks TB are defined in the in-cell touch type LCD. The plurality of touch blocks TB each have a group of pixel regions neighboring to one another in a row direction and a column direction.

Gate lines 114 and data lines 116 are formed on a substrate and cross each other to define pixel regions.

Each pixel region includes a thin film transistor T connected to the corresponding gate and data lines 114 and 116, and a pixel electrode 118 connected to a drain electrode 117 of the thin film transistor T.

A touch line 290a and a dummy touch line 290b is formed at a boundary of the pixel region between the pixel electrodes 118. A passivation layer (not shown) is formed on the touch line 290a, the dummy touch line 290b and the pixel electrode 118.

Common electrodes 270 are formed on the passivation layer and in respective touch blocks TB, and are separated from one another.

The touch line 290a is below the common electrodes 270. The touch line 290a is connected to the common electrode 270 of the corresponding touch block TB through a touch contact hole TCH. The touch line 290a is not connected to common electrodes 270 of touch blocks TB other than the corresponding touch block TB connected thereto. The touch line 290a transmits a touch signal i.e., change of capacitance between neighboring common electrodes 270.

The dummy touch line 290b is formed below the common electrodes 270 and is not connected to any common electrodes 270. In other words, the dummy touch line 190b does not transmit a touch signal.

In this regard, the touch lines 290a connected to the common electrodes 270 of the touch blocks TB are arranged substantially non-uniformly on an array substrate, thus capacitances between the common electrodes 270 and the touch lines 290a become different, and thus display quality is degraded. To prevent this, the dummy touch lines 290b are formed.

The touch line 290a and the dummy touch line 290b are not connected to each other with an open portion OPEN therebetween. The open portion OPEN is formed at a region other than a region of the gate line 114. In other words, the open portion OPEN is formed at the inner region TIA of the touch block TB.

Accordingly, a compensation pattern 290d extending from the touch line 290a and the dummy touch line 290b is formed corresponding to the gate line 114 at a boundary region of the touch block TB. The compensation pattern 290d are preferably formed to have the same shape as a connection pattern extending from the touch line 290a at an inner region of the touch block TB.

Figure 9:
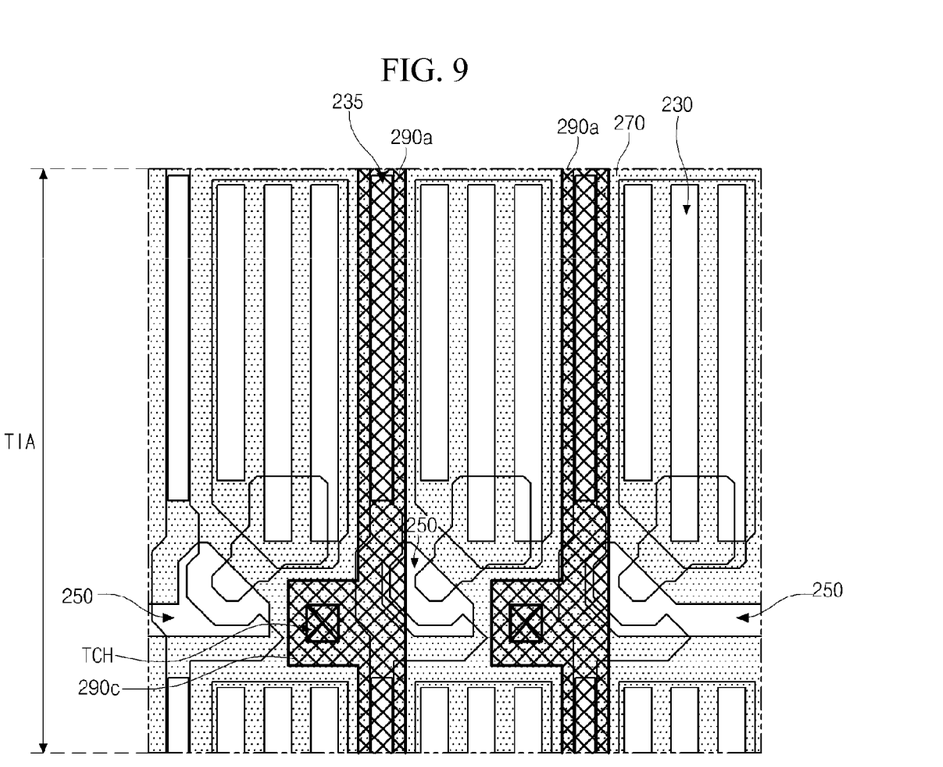
FIG. 9 is a view illustrating an inner region of a touch block of an in-cell touch type LCD according to a second embodiment of the present invention.
Figure 10:
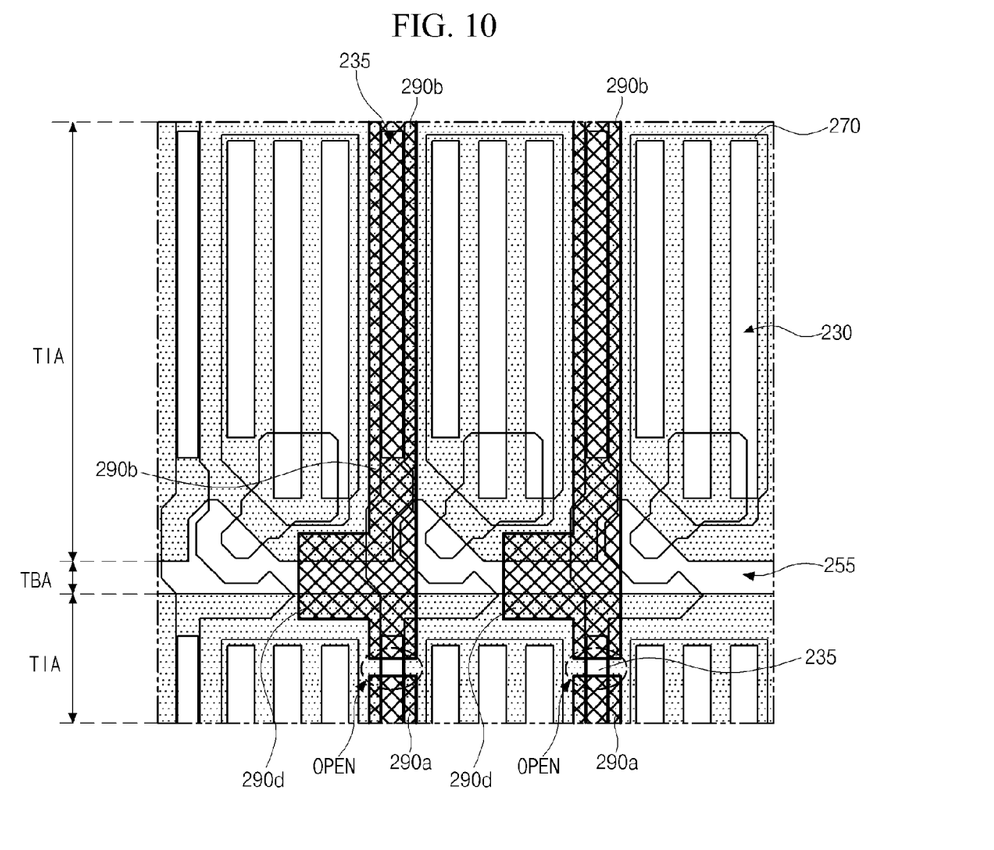
FIG. 10 is a view illustrating a boundary region of a touch block of an in-cell touch type LCD according to a second embodiment of the present invention.

FIG. 9 is a view illustrating an inner region of a touch block of an in-cell touch type LCD according to a second embodiment of the present invention, and FIG. 10 is a view illustrating a boundary region of a touch block of an in-cell touch type LCD according to a second embodiment of the present invention.

Referring to FIGS. 9 and 10, in the in-cell touch type LCD, a connection pattern 290c extends from the touch line 290a at the inner region TIA of the corresponding touch block TB, and is connected to the common electrode 270 through the touch contact hole TCH. The connection pattern 290c may be located corresponding to the gate line 114. The open portion OPEN is formed between the touch line 290a and the dummy touch line 290b.

The touch line 290a is formed at the boundary of the pixel region and extends along a direction.

The common electrode 270 includes first openings 230 in each pixel region, and a second opening 235 corresponding to the touch line 290a and the dummy touch line 290b. Further, the common electrode 270 includes a third opening 250 corresponding to the thin film transistor T, and a fourth opening 255 corresponding to the gate line 114. The common electrodes 230 are separated by the fourth opening 255.

The common electrode 270 includes a third opening 250 corresponding to the thin film transistor T, and extends over the gate line 114 at the inner region TIA of the touch block TB.

The connection pattern 290c extending from one side of the touch line 290a is connected to the common electrode 270 through the touch contact hole TCH, and the touch line 290a transmits a touch signal to a sensing circuit.

It is preferred, but not limited, that the touch line 290a and the dummy touch line 290b are formed of a low resistance metal material such as aluminum (Al) or copper (Cu) to prevent delay of a touch signal.

A first passivation layer is formed on the pixel electrode 118. The touch line 290a and the dummy touch line 290b are formed on the first passivation layer at the boundary of the pixel region. A second passivation layer is formed on the touch line 290a and the dummy touch line 290b. The common electrode 270 is formed on the second passivation layer.

The compensation pattern 290d extends from one side of the touch line 290a and the dummy touch line 290b at the boundary region TBA of the touch block TB and corresponds to the gate line 114.

A separate distance between the common electrodes 270 at the boundary region TBA of the touch block TB may be reduced to about 2 um to prevent short-circuit between the common electrodes 270.

Accordingly, an area of the common electrode 270 over the gate line 114 at the boundary region TBA of the touch block TB may be almost equal to an area of the common electrode 270 over the gate line 114 at the inner region TIA of the touch block TB.

Accordingly, a load of the gate line 114 at the boundary region TBA of the touch block TB is equal to a load of the gate line 114 at the inner region TIA of the touch block TB, thus output waveforms of the gate lines 114 become equal and charging times of data voltages of pixel electrodes 118 becomes equal, and thus brightness of the pixel region at the inner region TIA of the touch block TB and brightness of the pixel region at the boundary region TBA of the touch block can become equal. Therefore, degradation of display quality can be prevented.

Further, the open portion OPEN between the touch line 290a and the dummy touch line 290b is formed outside a region of the gate line 114 at the boundary region TBA of the touch block TB.

The open portion OPEN is preferably formed below the gate line at the boundary region TBA of the touch block TB and between the pixel regions.

The open portion OPEN is formed outside the gate line at the boundary region TBA, and thus the compensation pattern 290d extending from the dummy touch line 290a can be formed over the gate line at the boundary region TBA.

In accordance with example embodiments, an in-cell touch type LCD may be provided that compensates for a load difference between a gate line at an inner region of a touch block and a gate line at a boundary region of a touch block and improves display quality. As described above, in the in-cell touch type LCD, the open portion between the touch line and the dummy touch line is formed outside the gate line at the boundary region of the touch block, and the compensation pattern, which has the same shape as the connection pattern at the inner region of the touch block is formed over the gate line at the boundary region of the touch block. Therefore, brightness of the pixel regions at the inner region of the touch block can be equal to brightness of the pixel region at the boundary region of the touch block, and thus display quality can be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An in-cell touch type liquid crystal display device, comprising:
    gate and data lines crossing each other at a boundary of a pixel region on a substrate which includes a plurality of touch block each including a plurality of pixel regions;
    a thin film transistor in each pixel region and connected to the gate and data lines;
    a pixel electrode in the pixel region connected to the thin film transistor;
    a first passivation layer on the pixel electrode;
    a touch line and a dummy touch line along a direction between neighboring pixel electrodes on the first passivation layer;
    a second passivation layer on the touch line and the dummy touch line; and
    common electrodes separated from one another in respective touch blocks, and each including first openings corresponding to each pixel region and a second opening corresponding to the touch line,
    wherein a connection pattern extending over the gate line from a side of the touch line at an inner region of the touch block is connected to the common electrode through a touch contact hole, and
    wherein an open portion is between the touch line and the dummy touch line.

2. The device of claim 1, wherein the open portion is outside the gate line at a boundary region of the touch block.

3. The device of claim 2, further comprising a compensation pattern extending over the gate line from a side of the dummy touch line at the boundary region of the touch block.

4. The device of claim 3, wherein the compensation pattern has substantially the same shape as the connection pattern.

5. The device of claim 4, wherein a separate distance between neighboring common electrodes over the gate line at the boundary region of the touch block is at least about 2 um.

6. The device of claim 1, wherein each of the touch line and the dummy touch line is of a low resistance metal material.

* * * * *